United States Patent
Bell

(12) 
(10) Patent No.: US 6,715,744 B2
(45) Date of Patent: Apr. 6, 2004

(54) AIR SPRING SHOCK ABSORBER MODULE WITH INTERNAL LOAD-BASED DAMPING ADJUSTMENT

(75) Inventor: Stephen H. Bell, Guelph (CA)

(73) Assignee: Arvin Technologies, Inc., Troy, MI (US)

(*) Notice: Subject to any disclaimer, the term of this patent is extended or adjusted under 35 U.S.C. 154(b) by 0 days.

(21) Appl. No.: 10/186,508

(22) Filed: Jul. 1, 2002

(65) Prior Publication Data

US 2004/0000748 A1 Jan. 1, 2004

(51) Int. Cl.$^7$ ............................................. F16F 9/50
(52) U.S. Cl. ............... 267/64.15; 188/318; 188/322.13; 188/266.5; 188/269; 267/64.24; 267/122
(58) Field of Search .......................... 267/64.15, 64.28, 267/64.24, 64.23, 64.21, 64.19, 122, 140.13, 140.14; 280/5.519, 6.159, 6.16, 124.158, 124.159; 188/322.13, 266.5, 266.6, 269, 322.16, 322.17, 322.19, 322.2, 299.1, 322.22, 195, 318, 297, 298, 285

(56) References Cited

U.S. PATENT DOCUMENTS 6,161,662 A * 12/2000 Johnston et al. ......... 188/282.3

* cited by examiner

Primary Examiner—Douglas C. Butler
(74) Attorney, Agent, or Firm—Carlson, Gaskey & Olds

(57) ABSTRACT

A suspension assembly is provided that includes a shock absorber having a housing filled with hydraulic fluid. An air spring is supported on the shock absorber, and the air spring includes a bladder filled with air. A valve assembly is surrounded by the fluid housing and the bladder. The valve assembly is in fluid communication with the hydraulic fluid and air. The air manipulates the valve and adjusts flow of hydraulic fluid through the shock absorber to adjust damping based upon vehicle load experienced at the air spring. Preferably the valve assembly is located within the inner cylinder head arranged between the piston rod and the outer cylindrical wall of the shock absorber. The valve assembly may include a teeter-totter valve that cooperates with other valves plungers and springs to provide variable damping throughout the vehicle load experienced by the inner spring. Alternatively, a linear two positioned valve may be used to change the damping in response to a predetermined pressure within the air spring corresponding to a particular vehicle load.

25 Claims, 5 Drawing Sheets

AIR SPRING SHOCK ABSORBER MODULE WITH INTERNAL LOAD-BASED DAMPING ADJUSTMENT

BACKGROUND OF THE INVENTION

This invention relates to an air spring and shock absorber module, and more particularly, the invention relates to a shock absorber damping adjustment mechanism based upon air spring load.

Vehicles utilize shock absorbers to dampen vibrations and shocks experienced by a vehicle. Variations in load and ground conditions can affect vehicle control and handling. As a result, it is desirable to have the ability to selectively adjust the damping force in the shock absorber to improve vehicle control and handling as these variable change.

Vehicles utilizing air spring suspensions have combined the air spring and shock absorber into a single module to minimize the required space for the units and to save on bracket weight and cost. It is desirable for these modules to have the shock damping adjusted based upon the load carried by the air springs so that the damping corresponds to the vehicle load. Shocks have typically been calibrated to provide damping to the vehicle when fully loaded, however, this results in an over-damped suspension for conditions in which the vehicle is less than fully loaded. Prior art designs have connected an air line between the air spring and the shock absorber so that the air spring pressure may be utilized to adjust the damping of the shock absorber. A valve assembly has been mounted on the side of the shock absorber to receive the pressure from the air line. The valve assembly typically used is rather large and protrudes from the side of the shock absorber resulting in clearance issues, cost to manufacture and attach the housing, and vulnerability to damage. The external air lines are prone to damage. Large housing size is required to obtain the force from the air pressure to hold the damping settings because the mechanism is not isolated from fluid flow valve opening forces within the damper. Therefore, what is needed a compact adjustable damping device that receives the pressure from the air spring to adjust the damping based upon vehicle load.

SUMMARY OF THE INVENTION AND ADVANTAGES

This invention relates to a suspension assembly including a shock absorber having a housing filled with hydraulic fluid. An air spring is supported on the shock absorber, and the air spring includes a bladder filled with air. A valve assembly is surrounded by the fluid housing and the bladder. The valve assembly is in fluid communication with the hydraulic fluid and air. The air manipulates the valve and adjusts flow of hydraulic fluid through the shock absorber to adjust damping based upon vehicle load experienced at the air spring. Preferably the valve assembly is located within the inner cylinder head arranged between the piston rod and the outer cylindrical wall of the shock absorber. The valve assembly may include a teeter-totter valve that cooperates with other valves and springs to provide variable damping throughout the vehicle load experienced by the inner spring. Alternatively, a linear two positioned valve may be used to change the damping in response to a predetermined pressure within the air spring corresponding to a particular vehicle load.

Accordingly, the above invention provides a compact adjustable damping device that receives the pressure from the air spring to adjust the damping based upon vehicle load.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
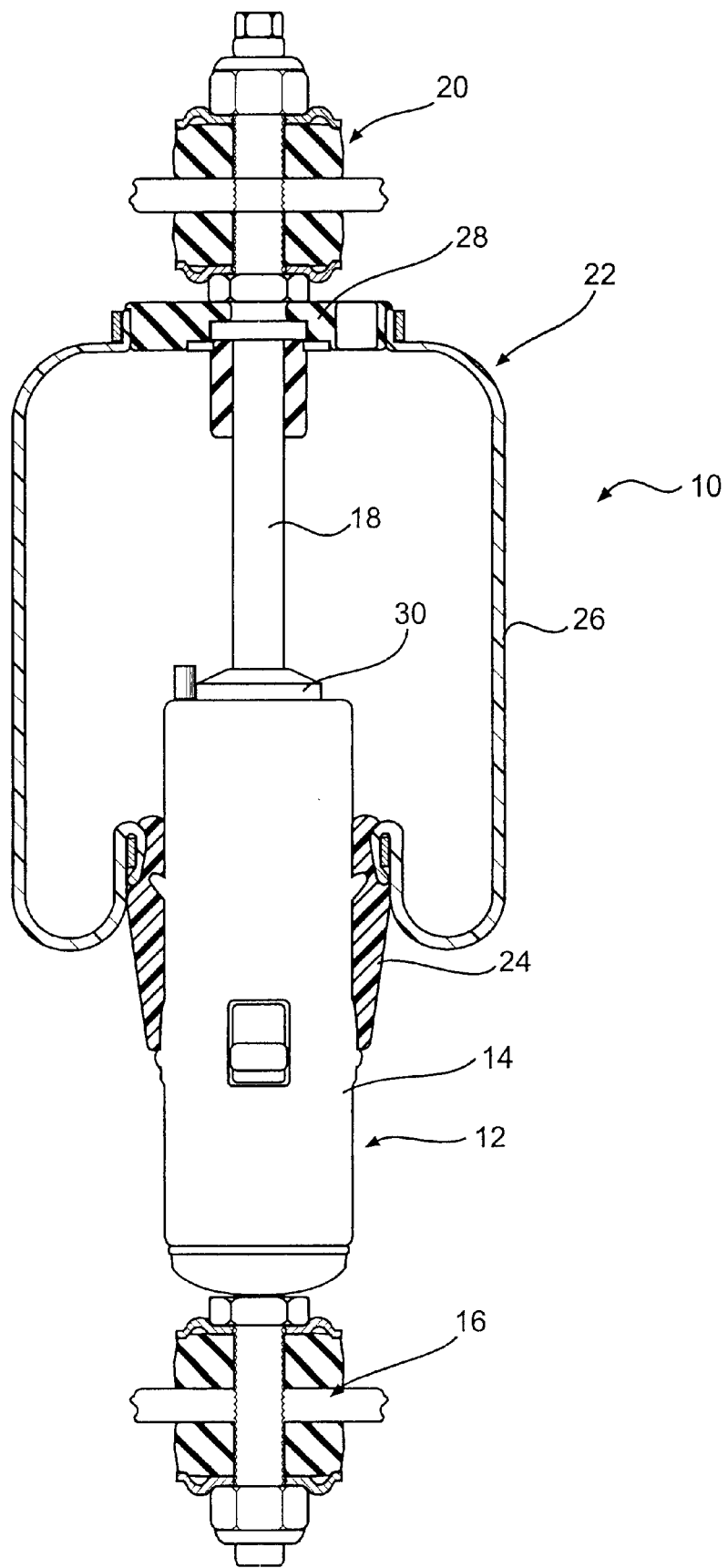
FIG. 1 is a partial cross-sectional view of the present invention air spring and shock absorber module.

A suspension assembly module 10 is shown in FIG. 1 including a shock absorber 12 and an air spring 22. The shock absorber 12 is preferably of a twin tube configuration and includes a housing 14. A lower mount 16 is supported on housing 14. A piston rod 18 is received within the housing 14 and moves linearly within the housing 14. The piston rod 18 has an upper mount 20. The air spring 22 is supported at one end on the housing 14 by a piston 24. A sleeve 26 is secured to the piston 24 and extends about the housing 14 and piston rod 18. The other end of the sleeve 26 is supported by a cap 28 secured to the piston rod 18. An inner cylinder head 30 supports the piston rod 18 for movement within the housing 14.

Typically, a rather large exteriorly located valve assembly extends from the housing 14 below the piston 24. An air line is run from the valve assembly to a portion of the air spring to provide the air spring pressure to the valve assembly thereby utilizing the pressure from the air spring to adjust the valve assembly and, in turn, adjust the shock absorber damping. As discussed above, such a valve assembly configuration is undesirable. To this end, the present invention provides a valve assembly 50 shown in FIG. 2, preferably located within the inner cylinder head 30. The housing 14 includes an inner hydraulic fluid chamber 32 or working chamber defined by an inner wall 34. A piston 36 is disposed within the inner chamber 32 and is secured to the piston rod 18. The piston 36 moves through the fluid in the inner chamber 32 to provide damping in response to vehicle inputs. The housing 14 also includes an outer wall 38 defining an outer chamber 40 or reservoir that is in fluid communication with the inner chamber 32 through compression head 42. The compression head includes fluid passageways connecting the inner 32 and outer 40 chamber to provide damping during a compression stroke in which the piston 36 moves toward the compression head 42. A gas cell 44 is arranged within the outer chamber 40 to prevent foaming of the hydraulic fluid located within.

Damping may also be controlled, for example during the recoil stroke in which the piston 36 moves towards the inner cylinder head 30, by passageways in the inner cylinder head 30 interconnecting the inner 32 and outer 40 chamber. The valve assembly 50 may be used to adjust the damping through the inner cylinder head 30 in response to the pressure within the air spring 22. However, it is to be understood the valve assembly 50 of the present invention may also be used in the compression head 42.

Figure 2:
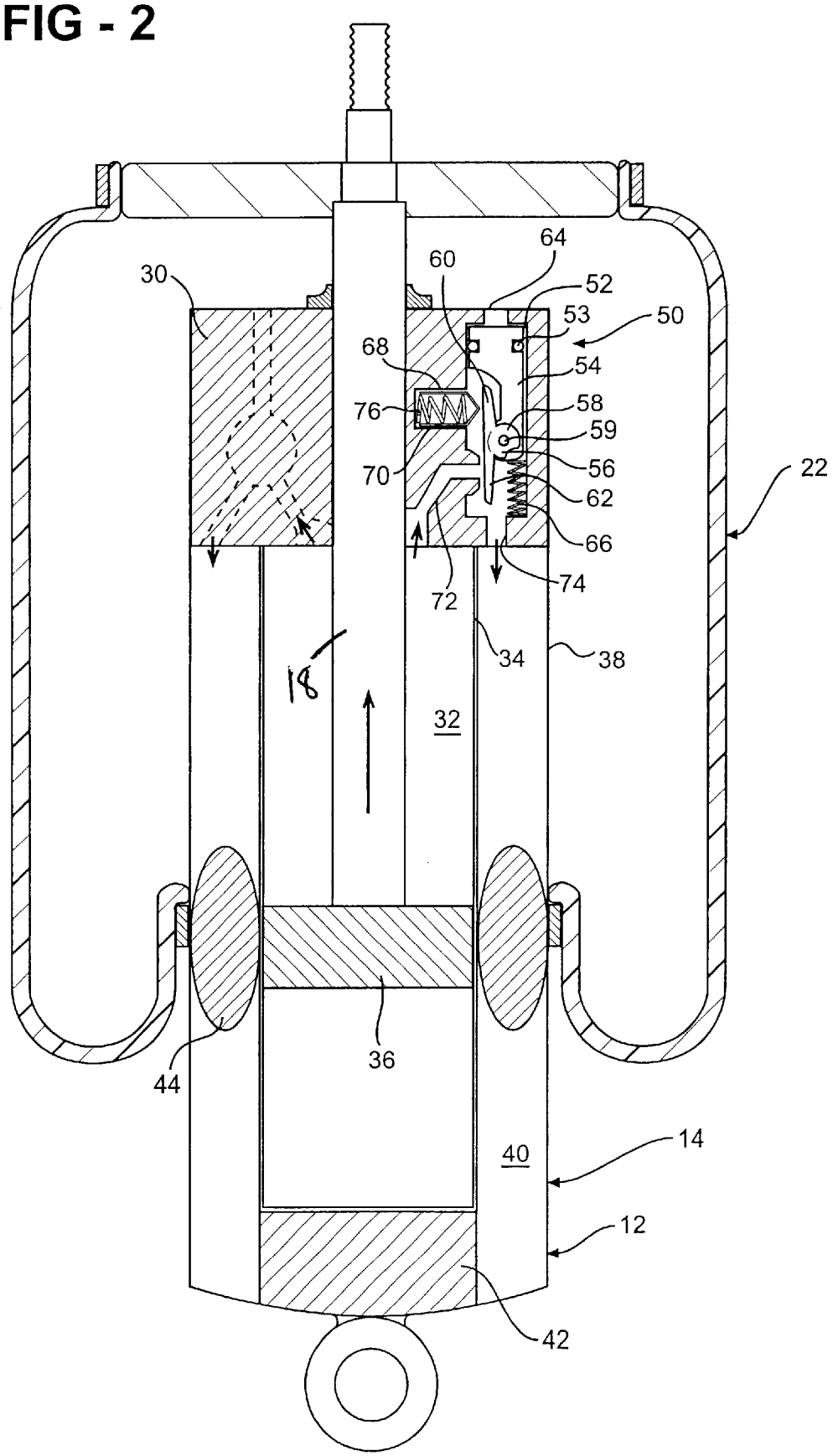
FIG. 2 is a cross-sectional view of the present invention valve assembly in a vertical orientation in a soft setting.

The valve assembly is shown in a vertical orientation in FIG. 2. The valve assembly 50 includes a first bore 52 with a first plunger disposed therein. An O-ring 53 is arranged between the first bore 52 and first plunger 54 to prevent hydraulic fluid from leaking past the first plunger 54. An arm 56 or teeter-totter valve includes an intermediate portion 58 that is pivotally secured to the plunger valve 54 by a pin 59. The arm 56 also includes first 60 and second 62 opposing end portions. A first inlet 64 fluidly interconnects the air spring cavity and the first bore 52 to provide air pressure from the air spring at one end of the first plunger 54. A first compression spring 66 is arranged opposite the first inlet 64 within the bore 52 to bias the first plunger 54 toward the first inlet 64. A second bore 68 is arranged within the inner cylinder head 30 transverse to the first bore 52, preferably perpendicularly. The second bore 68 is aligned with the first end portion 60. A second plunger 70 is disposed within the second bore 68 and engages with the first end portion 60. The second inlet 72 fluidly interconnects the inner chamber 32 with the first bore 52 at an end of the first plunger 54 opposite the first inlet 64. An outlet 74 fluidly interconnects the outer chamber 40 with the first bore 52 opposite the first inlet 64. The second end portion 62 is arranged between the second inlet 72 and outlet 74 to separate the second inlet 72 and outlet 74 when the arm 56 is in the closed position. A second spring 76 is arranged within the second bore 68 and urges the second plunger 70 toward the first end portion 60 to rotate the arm 56 about the pin 59 and urge the second portion 62 to the closed position.

The valve assembly 50 provides variable damping in response to varying air spring loads that correspond to different vehicle loads. In operation, increasing pressure from the air spring at the first inlet 64 moves the first plunger 54 and arm 56 toward the outlet 74 compressing the first spring 66. As a result, the second plunger 70 engages the first end portion 60 at a position farther away from the pin 59 applying a greater biasing force to the closed position. While the biasing force from the spring 76 is greater, the fluid force from inlet 72 is closer to the pin 56 adding the to the increased force need to move the arm 56 to the open position. A rather larger fluid force must be generated at second inlet 72 against second portion 62 to pivot the arm 56 above the pin 59 and compress the second spring 76 than at the initial plunger 54 position. Accordingly, increased damping and a firmer ride will result at higher vehicle load conditions.

Conversely, low air pressure exerted at first inlet 64 from the air spring will not compress the first spring 66 as much placing the second plunger 70 closer to the pin 59. A lower amount of force generated by the hydraulic fluid at second inlet 72 will be needed to rotate the arm 56 about the pin 59 to permit hydraulic fluid flow from the inner chamber 32 to the outer chamber 40. As a result, less damping will occur at lighter vehicle load conditions avoiding an over-damped condition typically experienced in prior art valve assemblies. Of course, the first plunger 54 and arm 56 may move between an infinite number of positions within the first bore 52 providing variable damping throughout any number of load conditions. The springs, the bore sizes and locations, and the arm geometry may be changed to provide particular damping characteristics.

Figure 3:
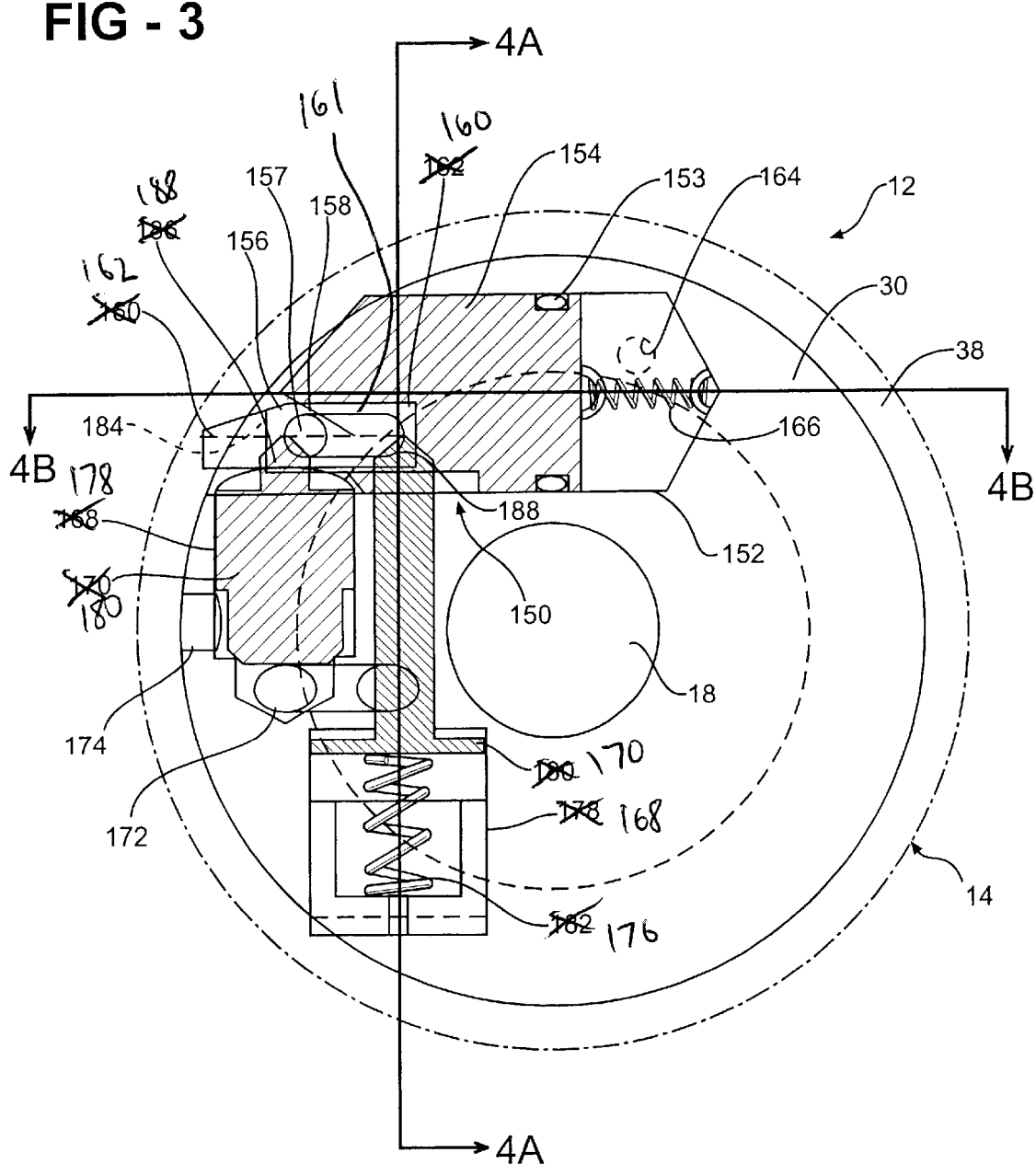
FIG. 3 is a cross-sectional view of the inner cylinder head with the valve assembly in a horizontal orientation in a firm setting.
Figure 4A:
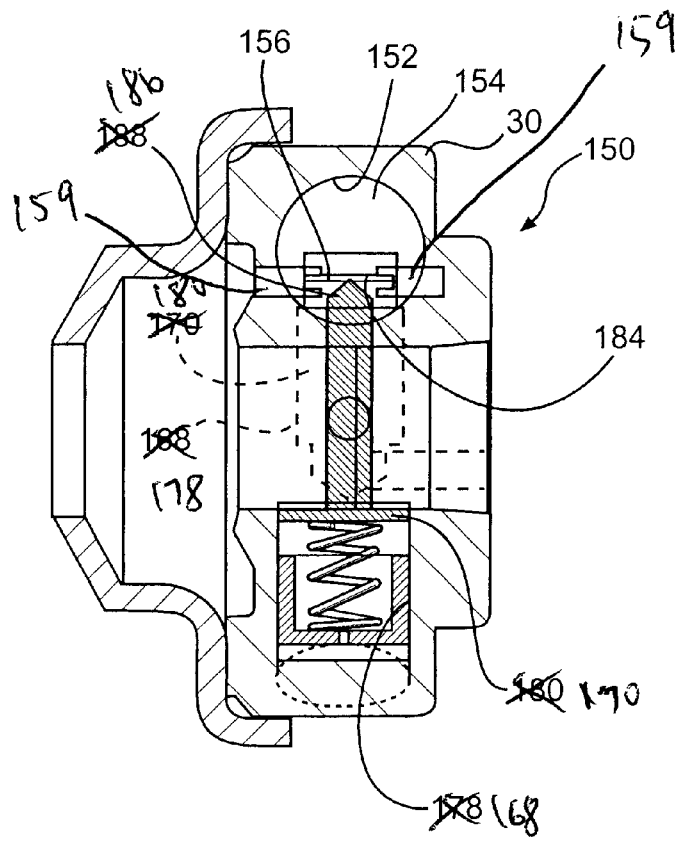
FIG. 4A is a cross-sectional view of the inner cylinder head taken along lines 4A—4A of FIG. 3.
Figure 4B:
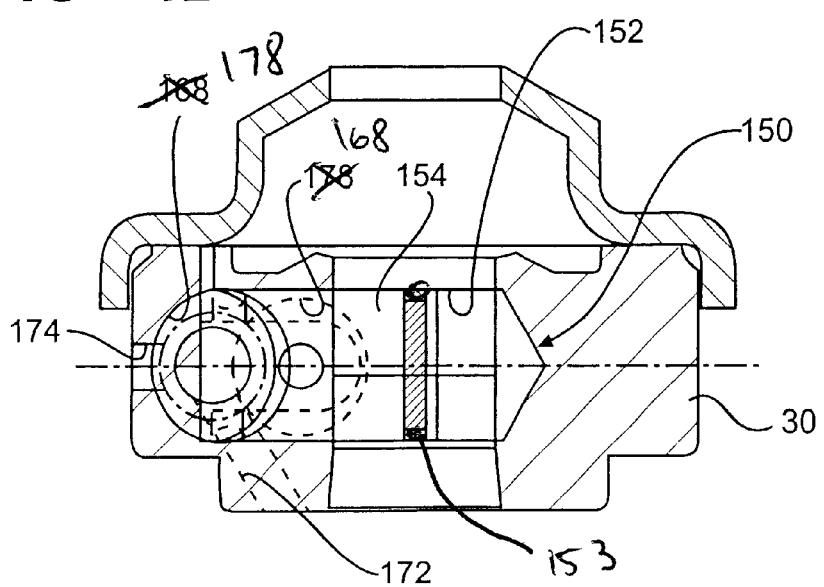
FIG. 4B is a cross-sectional view of the inner cylinder head taken along lines 4B—4B of FIG. 3.

A horizontal geometry for valve assembly 150 is shown in FIGS. 3, 4A, and 4B. The valve assembly 150 includes a first bore 152 with a first plunger 154 disposed therein. An O-ring 153 is arranged between the first bore 152 and first plunger 154 to prevent hydraulic fluid from leaking from the first bore 152. An arm 156 is pivotably attached to the first plunger 154 by two pins 159 at an intermediate portion 158 of the arm 156. The arm 156 also includes first 160 and second 162 end portions. The inner cylinder head 30 includes a slot 161 that permits the pins 159, the first plunger 154 and the arm 156 to slide relative to the inner cylinder head 30 thereby permitting variable valve geometry during the operation of the valve assembly 150 while preventing undesirable rotation of the first plunger 154.

A first inlet 164 fluidly interconnects the first bore 152 and the air spring cavity. A first extension spring 166 biases the first plunger 154 toward the first inlet 164. A second bore 168 is arranged transverse to the first bore 152, preferably perpendicularly, and is aligned with the first end portion 160. A second plunger 170 is arranged within the second bore 168 and engages the first end portion 160. A second spring 176 urges the second plunger 170 into engagement with the first end portion 160.

A third bore 178 is arranged transverse to the first bore 152, preferably perpendicular thereto and parallel with the second bore 168. A second inlet 172 extends from the inner chamber to the third bore 178, and outlet 174 extends from the third bore 178 to the outer chamber. A first valve 180 engaging the second end portion 162 is disposed within the third bore 178 and prevents flow from inlet 172 to outlet 174 when the arm is in the closed position. The arm 156 may include a groove 184 that receives ends 186 and 188 respectively from second plunger 170 and first 180 valve to also prevent rotation of the first plunger 154 within the first bore 152. The valve assembly 150 operates in a manner similar to that described relative to valve assembly 50.

Figure 5:
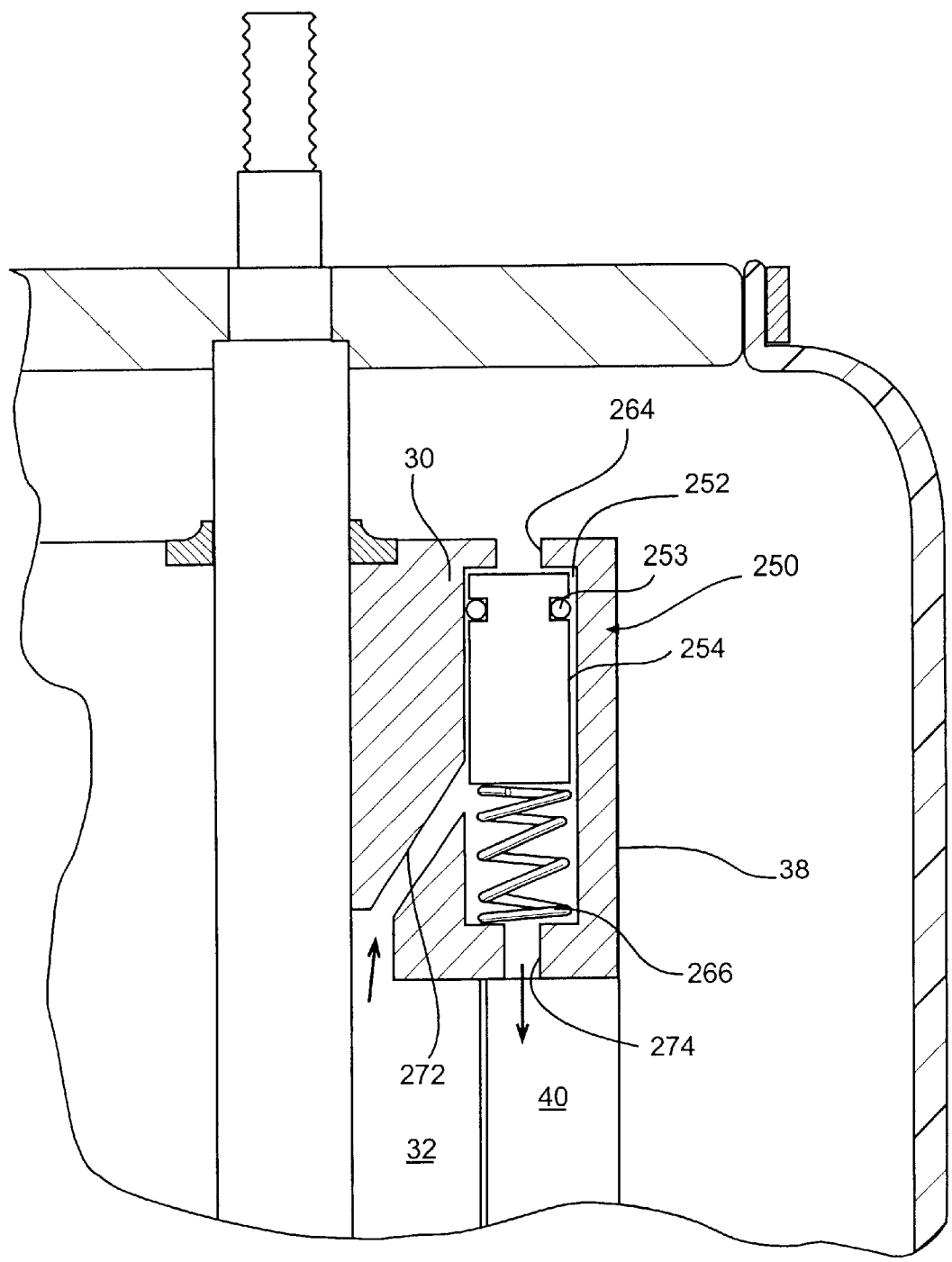
FIG. 5 is a cross-sectional view of a two position valve assembly in a vertical orientation.

Valve assemblies 50 and 150 provide variable damping throughout various vehicle loading conditions. However, a more simplified valve may be desired. To this end valve assembly 250 may be used, as shown in FIG. 5. The valve assembly 250 is a two position valve that moves linearly between opened and closed positions. A first bore 252 may be arranged in the inner cylinder head 30. A first valve 254 is arranged within the first bore 252 and includes an O-ring 253 arranged between the first bore 252 and first valve 254. A first inlet 264 fluidly interconnects the first bore 252 and the air spring cavity. A first spring 266 urges the first valve 254 toward the first inlet 264. A second inlet 272 fluidly interconnects the inner chamber 32 with the first bore 252. An outlet 274 fluidly interconnects the outer chamber 40 with the first bore 252.

In operation, under heavy vehicle loads the first valve 254 moves away from a first inlet 264 and compresses first spring 266 to separate the second inlet 272 and outlet 274 to prevent fluid communication between the inner 32 and outer 40 chambers. Under light vehicle loads, the first spring 266 biases the first valve 254 toward the first inlet 264 to fluidly interconnect the second inlet 272 and outlet 274. The valve size and spring may be changed to set the predetermined air spring pressure at which the valve opens and closes.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension system valve assembly for use with an air spring and fluid shock absorber comprising:
   a housing;
   a first bore in said housing with a first plunger slideably disposed within said first bore, said first plunger including an arm having an intermediate portion pivotally supported on said first plunger with said arm including first and second opposing end portions extending from said intermediate portion;
   a first inlet in said housing in fluid communication with said first bore on one side of said first plunger, said first inlet in fluid communication with an air spring bladder,
   a first spring disposed within said first bore coacting with said first plunger urging said first plunger toward said first inlet;
   a second bore in said housing transverse to and intersecting with said first bore, said second bore aligned with said first end portion with a second plunger slidably disposed within said second bore coacting with said first end portion;
   a third bore in said housing transverse to and intersecting with said first bore, said third bore aligned with said second end portion with a first valve slideably disposed within said third bore coacting with said second end portion;
   a second inlet in said housing in fluid communication with said third bore opposite said first end portion, said second inlet in fluid communication with a shock absorber fluid chamber;
   an outlet in said housing in fluid communication with said second inlet with said first valve in an open position;
   a second spring disposed within said second bore coacting with said second plunger urging said second plunger toward said first end portion and rotating said arm about said intermediate portion urging said first valve to a closed position with said second inlet and outlet fluidly separated from one another.

2. The assembly according to claim 1, wherein said second plunger and first valve are generally parallel.

3. The assembly according to claim 2, wherein said first, and second plungers and first valve are generally coplanar.

4. The assembly according to claim 1, wherein at least one of said second plunger and first valves is generally perpendicular to said first plunger.

5. The assembly according to claim 1, wherein said first and second springs are coil springs.

6. The assembly according to claim 1, wherein said first plunger is constrained against rotation relative to said first bore.

7. The assembly according to claim. 6, wherein said arm includes a groove receiving ends of said second plunger and first valve.

8. The assembly according to claim 1, wherein a seal is arranged between said first plunger and said first bore.

9. The assembly according to claim 1, wherein the arm defines soft and firm positions with the first end portion closer to said third bore in said firm position than in said soft position.

10. A suspension assembly comprising:
   a shock absorber including a housing filled with hydraulic fluid;
   an air spring supported on said shock absorber, said air spring including a bladder filled with air; and
   a valve assembly surrounded by said fluid housing and said bladder, said valve assembly in fluid communication with said hydraulic fluid and said air, said air manipulating said valve and adjusting flow of said hydraulic fluid, said valve assembly including a plunger and an arm pivotally supported on said plunger, one of said air and said hydraulic fluid generating axial force on said plunger and the other of said air and said hydraulic fluid generating a force on said arm pivoting said arm relative to said plunger.

11. The assembly according to claim 10, wherein said housing includes an outer cylindrical wall with said valve assembly disposed within said outer cylindrical wall.

12. The assembly according to claim 11, wherein said shock absorber includes a piston rod disposed within said housing and said valve assembly is arranged between said outer cylindrical wall and said piston rod.

13. The assembly according to claim 12, wherein said shock absorber includes an inner cylinder head mounted at an end of said outer cylindrical wall supporting said piston rod with said valve assembly disposed within said inner cylinder head.

14. A suspension assembly comprising:
   a shock absorber including a housing filled with hydraulic fluid;
   an air spring supported on said shock absorber, said air spring including a bladder filled with air;
   a valve assembly surrounded by said fluid housing and said bladder, said valve assembly in fluid communication with said hydraulic fluid and said air, said air manipulating said valve and adjusting flow of said hydraulic fluid; and
   a housing including a first bore with a first plunger slideably disposed within said first bore, said first plunger including an arm having an intermediate portion pivotally supported on said first plunger with said arm including first and second opposing end portions extending from said intermediate portion, a first inlet in said housing in fluid communication with said first bore on one side of said first plunger, said first inlet in fluid communication with an air spring bladder, and a first spring disposed within said first bore coacting with said first plunger urging said first plunger toward said first inlet.

15. The assembly according to claim 14, including a second bore in said housing transverse to and intersecting with said first bore, and said second bore aligned with said first end portion with a second plunger slideably disposed within said second bore coacting with said first end portion.

16. The assembly according to claim 15, including a second inlet in said housing in fluid communication with a third bore in said housing transverse to and intersecting with said first bore opposite said first end portion, said second inlet in fluid communication with a shock absorber fluid chamber, and an outlet in said housing in fluid communication with said second inlet with a first valve in an open position, said second bore aligned with said first end portion with a second plunger slideably disposed within said second bore coacting with said first end portion, and a second spring disposed within said second bore coacting with said second plunger urging said second plunger toward said first end portion and rotating said arm about said intermediate portion urging said first valve to a closed position with said second inlet and outlet fluidly separated from one another.

17. The assembly according to claim 15, including a second inlet in said housing in fluid communication with said first bore opposite said first end portion, said second inlet in fluid communication with a shock absorber fluid chamber, and an outlet in said housing in fluid communication with said second inlet with said arm in an open position, wherein said second end portion is disposed between said second inlet and said outlet, and including a second spring disposed within said second bore coacting with said second plunger urging said second plunger toward said first end portion and rotating said arm about said intermediate portion urging said arm to a closed position with said second inlet and outlet fluidly separated from one another by said second end portion.

18. A suspension assembly comprising:

a shock absorber including a housing filled with hydraulic fluid, an air spring supported on said shock absorber, said air spring including a bladder filled with air;

a valve assembly surrounded by said fluid housing and said bladder, said valve assembly in fluid communication with said hydraulic fluid and said air, said air manipulating said valve and adjusting flow of said hydraulic fluid; and a housing including a first bore with a first valve slideably disposed within said first bore, a first inlet in said housing in fluid communication with said first bore on one side of said first valve, said first inlet in fluid communication with an air spring bladder, and a first spring disposed within said first bore coacting with said first valve urging said first valve toward said first inlet, a second inlet in said housing in fluid communication with said first bore opposite said first end portion, said second inlet in fluid communication with a shock absorber fluid chamber, and an outlet in said housing in fluid communication with said second inlet with said first valve in an open position and said first valve fluidly separating said second inlet and said outlet in said closed position.

19. The assembly according to claim 18, wherein a seal is arranged between said first valve and said first bore.

20. A suspension system valve assembly for use with an air spring and fluid shock absorber comprising:

a housing;

a first bore in said housing with a first plunger slideably disposed within said first bore, said first plunger including an arm having an intermediate portion pivotally supported on said first plunger with said arm including first and second opposing end portions extending from said intermediate portion;

a first inlet in said housing in fluid communication with said first bore on one side of said first plunger, said first inlet in fluid communication with an air spring bladder;

a first spring disposed within said first bore coacting with said first plunger urging said first plunger toward said first inlet;

a second bore in said housing transverse to and intersecting with said first bore, said second bore aligned with said first end portion of arm with a second plunger slideably disposed within said second bore coacting with said first end portion;

a second inlet in said housing in fluid communication with said first bore opposite said first end portion, said second inlet in fluid communication with a shock absorber fluid chamber;

an outlet in said housing in fluid communication with said second inlet with said second end portion in an open position, said second end portion of arm disposed between said second inlet and said outlet; and a second spring disposed within said second bore coacting with said second plunger urging said second plunger toward said first end portion and rotating said arm about said intermediate portion urging said arm to a closed position with said second inlet and outlet fluidly separated from one another by said second end portion.

21. The assembly according to claim 20, wherein said second plunger is generally perpendicular to said first plunger.

22. The assembly according to claim 20, wherein said first and second springs are coil springs.

23. The assembly according to claim 20, wherein said first plunger is constrained against rotation relative to said first bore.

24. The assembly according to claim 20, wherein a seal is arranged between said first plunger and said first bore.

25. The assembly according to claim 20, wherein the arm defines soft and firm positions with the first end portion closer to said second bore in said firm position than in said soft position.

* * * * *